March 2, 1965 D. B. POWELL 3,171,931
MULTIPLE ELECTRIC CIRCUIT BREAKER WITH COMMON TRIP BAR
Filed March 28, 1963 2 Sheets-Sheet 1

INVENTOR:
DAVID B. POWELL,
BY J Wesley Hauber
ATTORNEY.

March 2, 1965  D. B. POWELL  3,171,931
MULTIPLE ELECTRIC CIRCUIT BREAKER WITH COMMON TRIP BAR
Filed March 28, 1963  2 Sheets-Sheet 2

INVENTOR:
DAVID B. POWELL,
BY J Wesley Nauber
ATTORNEY.

United States Patent Office 3,171,931
Patented Mar. 2, 1965

3,171,931
MULTIPLE ELECTRIC CIRCUIT BREAKER WITH
COMMON TRIP BAR
David B. Powell, Bristol, Conn., assignor to General
Electric Company, a corporation of New York
Filed Mar. 28, 1963, Ser. No. 268,738
2 Claims. (Cl. 200—116)

My invention relates to multipole electric circuit breakers and particularly to interlocked tripping means for current responsively tripped circuit breakers having individual overload tripping elements associated with each pole of the breaker, i.e. with each pair of cooperating contact members.

The invention is especially well adapted for use with small manually operable current responsively tripped air circuit breakers are electrically connected for double pole mounted in multiple arrays for the control of branch lighting and power loads, such as in residential and commercial service entrance load centers, industrial distribution panelboards and the like. Such panelboard circuit breakers are commonly made up with one or more single pole breakers in a single casing and may be utilized separately as single pole branch breakers or in ganged pairs as double pole breakers. When two such circuit breakers are electrically conected for double pole use in a single branch circuit, it is desirable to ensure that both breakers in any one circuit trip in response to actuation of the trip element of either of them. This is true whether or not the manually operating elements of the two breakers are coupled for simultaneous actuation.

As shown in Patent 2,779,881, Thomas, single pole circuit breakers of the foregoing type have been coupled for simultaneous tripping of two breakers which are disposed in side-by-side relation. The interlocking element there disclosed is positioned exteriorly of and between side recessed circuit breaker casings. Ganged breakers of this design thus require special casings the expense of which increases the cost of full line manufacture. Moreover the lateral casing recess requires an individual breaker design of appreciable thickness module.

In order to simplify the installation of service entrance equipment and reduce cost there has been an increasing use of multiple assemblies consisting of several complete single pole circuit breakers mounted in a single integral casing. It is desirable that such breakers be of a design to provide for either individual or ganged operation with minimum use of special parts. Also, the trend to increasing numbers of branch circuits to meet growing residential and commercial power loads has led to panel board circuit breaker designs of smaller physical size. Primarily it is desirable to decrease appreciably the thickness dimension of such breakers to permit more circuits in a panelboard of predetermined length. While the thickness module of commercially available circuit breakers of the type shown in the Thomas patent is commonly about one inch, it is now a growing practice to design for one half inch thickness. A circuit breaker of such narrow dimension requires a mechanism of simplified and narrow design and leaves very little space for any lateral interconnection between breakers.

Accordingly it is a general object of my invention to provide improved means for optionally interconnecting the separate operating mechanisms of several electric single pole circuit breakers with a minimum number of special parts.

It is a more particular object of my invention to provide means interior of the casing for interconnecting the operating mechanisms of a pair of circuit breakers disposed in end-to-end or tandem relation in integral or separate casings of extremely narrow proportion relative to requisite mechanical strength and electrical clearance.

It is a specific object of my invention to provide means interior of the casing for interconnecting the trip elements without appreciably affecting the width dimension of a pair of manually operable current responsively tripped electric circuit breakers of the service entrance type assembled in end-to-end relation in a single unitary casing.

In carrying out my invention in one preferred embodiment, I provide within a single narrow casing of suitable molded plastic insulating material a pair of substantially identical single pole electric circuit breakers disposed in essentially co-planar end-to-end or tandem relation. Each circuit breaker includes a pair of separable contacts, manually operable mechanism and a movable current responsive trip member. Individual latch members responsive to the current through the respective pairs of contacts normally restrain tripping movement of the trip members. To ensure that overload tripping of any one such end-to-end pair of breakers effects like tripping operation of the other, I provide a single flat interlocking bar interiorly of the casing which is positioned to be engaged and moved longitudinally by an operating part of either breaker when tripped. The initiating or operating part of each breaker mechanism is one which moves through a distinctive path in automatic trip operation only. The interlocking bar is provided with portions disposed to engage and unlatch the current responsive trip element of either breaker which is itself not released by the overload current. Preferably the manual operating handles of the two breakers are also coupled together and the operating mechanisms are of the trip free type. By this arrangement the manual handle of either breaker which is separately tripped by overcurrent is held by the other breaker in its "on" position until the second breaker is tripped by the interlock. Such handle interconnection ensures reliable operation of the trip interlock even with breaker mechanisms of the automatic reset type.

Further objects and advantages of my invention will be apparent to those skilled in the art from the following detailed specification taken in conjunction with the accompanying drawings in which.

Figure 1:
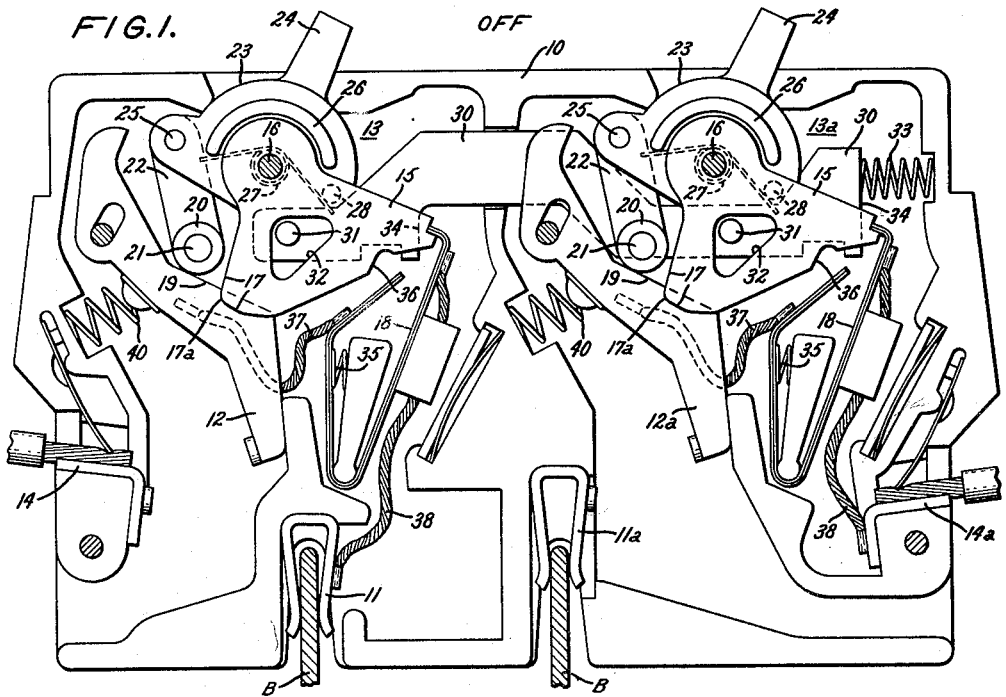
FIG. 1 is a side elevational view of a pair of single pole electric circuit breakers embodying my invention, the breakers being shown in their open circuit positions with a side of the casing removed.
Figure 2:
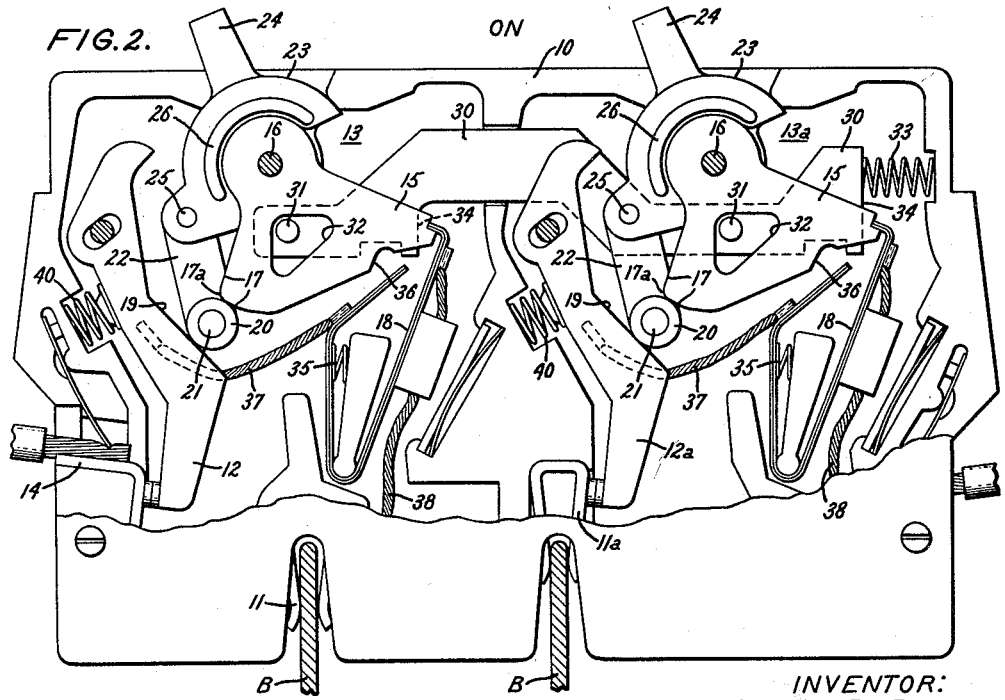
FIG. 2 is a side elevational view similar to FIG. 1 showing the same circuit breakers in their circuit closing positions.
Figure 3:
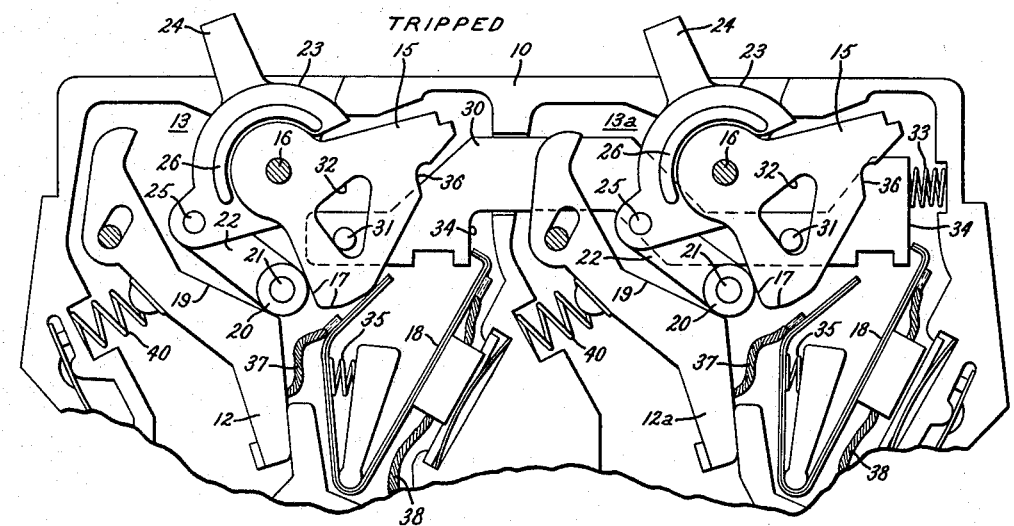
FIG. 3 is a side elevational view similar to FIGS. 1 and 2 showing the same circuit breakers in their automatic "trip free" positions (i.e. handles externally held "on")

Referring now to the drawing and particularly to FIGS. 1, 2 and 3, I have illustrated my invention as applied to a small manually operable current responsively tripped electric circuit breaker of the molded case type having a wedge and cam operating mechanism of the kind described and claimed in a co-pending patent application S.N. 242,-424 filed on December 5, 1962, by David B. Powell and assigned to the same assignee as the instant application. The thermal latch element of the circuit breaker mechanism illustrated herein is more specifically described and claimed in a co-pending patent application S.N. 248,293 filed on January 2, 1963, by Klein and Powell and assigned to the same assignee as the instant application.

As illustrated in the drawings, my multipole circuit breaker consists of two individual single pole circuit breaker mechanisms mounted in end-to-end relation in a single narrow and elongated casing 10. In the drawing, one side of the casing has been removed to expose the operating mechanism. In the lower central portion of the casing 10 there are located a pair of line terminal clips 11 and 11a adapted to be disposed in clamping relation on a pair of side-by-side flat busbars. Through a contact arm 12 of one circuit breaker 13 the line terminal clip 11 is connected to a first load terminal 14 at one end of the casing 10. Similarly the line terminal clip 11a is connected through a contact arm 12a of the other circuit breaker 13a to a second load terminal member 14a at the opposite end of the casing 10. The contact arms 12 and 12a are each biased to open circuit positions by separate springs 40 and actuated to closed position by individual manually operable current responsively tripped mechanisms of identical structure to like parts of which the same reference numerals will be applied.

Each operating mechanism for manually and automatically moving the separate circuit breaker contact arms 12 and 12a between their open circuit and closed circuit positions comprises a releasable tripping member 15 shown as a flat plate of insulating material loosely pivotally mounted upon a pivot pin 16 and having at its side adjacent the contact arm 12 a cam surface 17. The cam surface 17 is formed in two parts providing therebetween an apex point 17a with which a cam follower cooperates with an overcenter locking action to be more fully described hereinafter. The releasable tripping member 15 is normally restrained against tripping movement by means of a thermostatic latch member 18 which is preferably of the type described and claimed in the foregoing application S.N. 248,293.

The lateral edge of the contact arm 12 adjacent the normally fixed cam surface 17 constitutes a cooperating cam surface 19 of essentially linear configuration and is disposed to converge toward the cam surface 17 in the open circuit position of the parts as illustrated at FIG. 1. For manual closing and opening operation there is provided a movable wedging roller 20 rotatably mounted upon a pivot pin 21 at the free end of a swinging link 22. The link 22 is pivotally mounted eccentrically upon a rotary handle member 23 carried by the fixed pivot 16. Then handle member 23 is provided with a radial arm 24 which extends through the upper end wall of the casing 10 to serve as a handle lever. The link 22 carries a pin 25 by which the link is swingably mounted upon an internal arm of the handle 23. The upper portion of the handle member 23 is provided with an arcuate rim 26, one end of which serves as an abutment or shoulder to engage the releasable tripping member 15 when released and return it to latched position. The opposite end of the arcuate rim 26 acts as a handle abutment for one arm of a torsion spring 27 which encircles the fixed pivot 16 and has a second arm engaging a fixed stop 28. The spring 27 biases the rotary handle member 23 to the "off" or circuit-opening position shown at FIG. 1. As described in the foregoing application S.N. 242,424 this operating mechanism is both trip free and automatically resetting.

Figure 5:
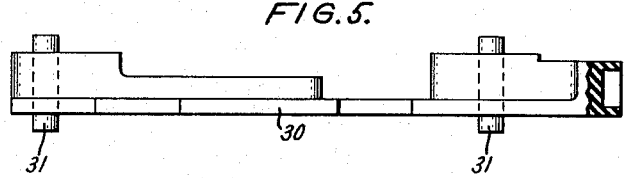
FIG. 5 is a top view of the trip interlock bar shown in side elevation in the other drawings.

As previously stated, each of the individual circuit breaker mechanisms mounted in the single casing 10 includes a releasable trip member 15 pivotally mounted upon a pivot 16 and normally restrained against tripping movement by a current responsive latching member 18. In order to couple the tripping members for simultaneous operation in the event of overload release of only one of the trip members 15, I provide an elongated interlock bar 30 slidably mounted in the casing 10 and provided at one side with laterally protruding pins 31. A top view of the bar 30 is shown at FIG. 5. Each pin 31 extends into a triangular aperture 32 in one of the releasable trip members 15 and is thus disposed to be engaged by the associated trip member 15 in automatic tripping operation to move the interlock bar 30 longitudinally against the bias of a compression spring 33 disposed between the casing 10 and one end of the bar 30. The spring 33 biases the bar 30 to a position of non-interference with the current responsive latch members 18. The interlock bar 30 is provided with two abutment portions 34 disposed each to engage its associated latch member 18 and move it to unlatching position when the interlock bar 30 is moved against its bias, i.e. to the right as shown in the drawing.

While it will be evident to those skilled in the art that any desired type of current responsive latch member may be utilized to restrain tripping movement of the trip members 15, I have shown a thermally responsive latch member in the form of a generally U-shaped bimetallic strip loosely pivotally mounted at its bight and biased to latching position by means of a spring 35. As more fully described in the foregoing patent application S.N. 248,293, the U-shaped bimetallic latch member 18 is arranged when heated by a predetermined excessive current to increase appreciably the divergence of its two legs and remove its latching leg from engagement with the trip member 15. This is accomplished by the free leg of the bimetal first engaging an abutment portion 36 of the trip member 15 whereupon it acts as a prop so that further thermal divergence causes unlatching movement of the latching leg. Each bimetallic latch member 18 is rendered current responsive by passing therethrough the current traversing the associated contact arm 12 or 12a. For this purpose one leg of each bimetallic latch 18 is connected by means of a flexible connector 37 to the associated contact arm 12 or 12a and the other leg of each bimetal is connected through a flexible connector 38 to the line terminal clip 11 or 11a, respectively.

It will now be evident that in manual operation when either handle lever 24 is moved from the position of FIG. 1 to the position of FIG. 2 the swingable actuating link 22 is moved downwardly and the wedging roller 20 forced between the cam surfaces 17 and 19, respectively, of the releasable tripping member 15 and the movable contact arm 12 (or 12a as the case may be). The roller 20 moves overcenter on the apex point 17a of the fixed cam surface 17 and locks the movable contact arm 12 (or 12a) in its closed circuit position against the bias of the contact spring 40 as shown at FIG. 2. In this position the force of the spring 40 upon the associated contact arm 12 (or 12a) is transmitted through the wedging roller or cam follower 20 to the releasable tripping member 15 by pressure against the normally fixed cam surface 17. This pressure from the contact bias spring serves, in the circuit closing position of the mechanism, to bias the releasable tripping member 15 for counterclockwise movement (as shown in the drawings) to a released or tripping position. Normally the releasable trip members 15 are restrained against such tripping movement by the current responsive latch members 18 so that in manual opening or closing operation the trip member 15 is stationary. Thus manual circuit opening movement for each of the breakers is the reverse of that described above for closing in that clockwise movement of the handle lever 24 raises the swingable link 22 and removes the roller 20 from wedging position between the fixed cam surface 17 and the contact arm surface 19.

Assuming now that both of the circuit breakers 13 and 13a and the casing 10 are in their circuit closing position as shown at FIG. 2, the operation upon overload release will be as follows. First let it be supposed that only one pole of the dual circuit breaker mechanism is affected by excessive overload current and that only one of the bimetallic latch members 18 moves to unlatching position in the manner previously described. When the thermal latch is released, for example in the circuit breaker 13, the associated trip member 15 moves counterclockwise (as shown in the drawing) about its pivot 16 under the influence of the contact spring 40 acting through the contact arm 12 and the wedging roller 20. Such movement permits the contact arm 12 to move to open circuit position and frees the swingable link 22 and roller 20 for upward movement out of wedging position under the influence of the handle spring 27. Clockwise movement of the handle member 23 under the influence of the spring 27 brings the annular rim 26 into engagement with the upper edge of the trip member 15 and returns the member 15 to its normal latched position awaiting return of the latch member 18. However the momentary counterclockwise movement of the trip member 15 causes it to strike the associated actuating pin 31 on the interlock bar 30 and move that bar longitudinally to the right (as shown in the drawing) against the bias of the spring 33. In thus moving toward the right the interlock bar 33 brings its abutment portion 34 associated with the other circuit breaker 13a into engagement with the latch member 18 of that breaker and mechanically unlatches the trip member 15 of circuit breaker 13. Accordingly the contact arm 12a of circuit breaker 13a moves to open circuit position substantially simultaneously with the opening movement of contact arm 12.

It will now be evident to those skilled in the art that in the event overload current simultaneously affects both of the thermal latch members 18 but does so in different degree, due either to different current values or slightly unequal overload settings, the first circuit breaker mechanism to trip will operate the interlock bar 30 to mechanically force simultaneous tripping of the other breaker.

Figure 4:
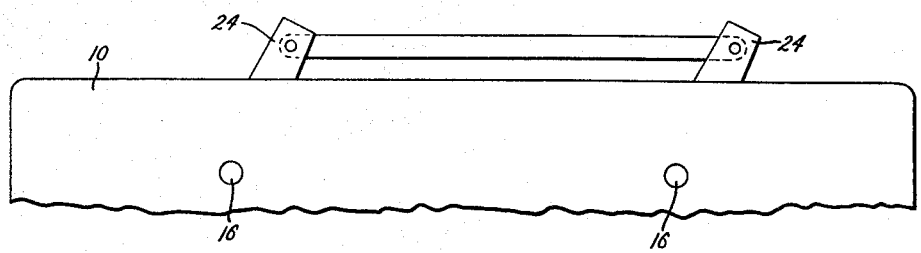
FIG. 4 is a fragmentary side elevational view illustrating that the manual operating handles of two circuit breakers embodying my invention may be coupled or ganged for simultaneous operation.

While I have illustrated the individual circuit breaker mechanisms within the common casing 10 as having independently operable manual operating handles 24, it will of course be understood by those skilled in the art that these handles may be mechanically coupled together for simultaneous or gang operation as illustrated in the fragmentary view of FIG. 4. Such coupling for manual operation is especially desirable where the two single pole contacts of the individual breakers are to be electrically connected as separate poles of a single branch circuit.

Mechanical coupling of the two operating handles 24 has a further advantage in ensuring proper operation of the trip unit interlock when the individual breaker operating mechanisms are of the automatic reset type. This may be understood by noting first that the circuit breaker actuating mechanisms described are of an automatic reset type, the biased handles 24 engaging the trip members 15 when released to return them to latching position. The actuating mechanisms are also trip free in that overcurrent tripping operation automatic reset may occur so operating handle 24 in "on" position. In the usual overcurrent tripping operation automatic rest may occur so quickly that the trip member 15 moves only slightly away from its latched position, i.e. just enough to allow the roller 20 to pass over the cam apex 17a. Such limited movement of the trip member 15 may be insufficient to actuate the interlock bar 30. However, if the breaker tripped by overcurrent is held in "trip free" position by holding its handle 24 in "on" position, the associated trip member 15 is moved through a substantial angle by the contact bias spring 40. Thus if the operating handles 24 are mechanically coupled as shown at FIG. 4 and only one breaker is tripped by overcurrent, that breaker is held "trip free" by the other breaker until the interlock positively trips the second breaker.

It will now be understood by those skilled in the art that while my invention has particular application to individual circuit breaker mechanisms disposed in end-to-end tandem relation, the particular type of operating mechanism is not significant except insofar as it must include some part movable in automatic tripping operation through a path not transversed in manual operation. If an automatic reset mechanism is used, it is desirable to have it also trip-free in operation and to couple the manual handles together to ensure reliable operation of the trip interlock.

While I have illustrated only a preferred embodiment of my invention by way of illustration, many modifications will occur to those skilled in the art, and I therefore wish to have it understood that I intend in the appended claims to cover all such modifications as fall within the true spirit and scope of my invention.

What I claim as new and desire to secure by Letters Patent of the United States is:

1. A multipole circuit breaker comprising an elongated flat casing of relatively narrow dimension, a pair of individual circuit breaker mechanisms mounted within said casing in end-to-end substantially co-planar relation and each comprising a pair of separable contacts including a flat blade-like movable contact arm biased to circuit opening position, each said circuit breaker mechanism including also a movably mounted flat trip member having an aperture therein and a cam surface on one edge thereof, separate latch means restraining said trip members against circuit-opening movement and responsive respectively to excessive current through the associated contact to release said trip members, separate manually operable wedge means movable between each said contact arm and the associated cam surface for manually opening and closing said contacts, each said manually operable means including a handle member biased to circuit opening position and arranged to engage and automatically return the associated trip member to latching position, said trip members of both of said mechanisms moving in the same general direction when released by said latch means, and a flat elongated interlock bar mounted for rectilinear sliding movement within said casing, said interlock bar having portions disposed to engage and mechanically release each said latch means and carrying a pair of transverse pins disposed within said trip member apertures for driving engagement with said trip members upon release thereof.

2. A multipole circuit breaker as defined in claim 1 in which the manually operable handles thereof are coupled together for simultaneous movement between circuit-opening and circuit-closing positions.

References Cited by the Examiner
UNITED STATES PATENTS

| | | | |
|---|---|---|---|
| 2,160,236 | 5/39 | Taylor | 200—116 |
| 2,503,409 | 4/50 | Platz | 200—116 |
| 2,779,831 | 1/57 | Thomas | 200—116 |
| 2,934,624 | 4/60 | Middendorf | 200—116 |
| 2,956,133 | 10/60 | Middendorf | 200—116 |

BERNARD A. GILHEANY, *Primary Examiner.*